US012344509B2

(12) United States Patent
Gooden

(10) Patent No.: US 12,344,509 B2
(45) Date of Patent: Jul. 1, 2025

(54) ELEVATOR RAIL CLEANING DEVICE

(71) Applicant: OTIS ELEVATOR COMPANY, Farmington, CT (US)

(72) Inventor: Demetrious Gooden, Florence, SC (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/177,286

(22) Filed: Mar. 2, 2023

(65) Prior Publication Data

US 2024/0294359 A1 Sep. 5, 2024

(51) Int. Cl.
*B66B 7/12* (2006.01)
*A46B 13/00* (2006.01)
*A46B 13/02* (2006.01)
*B08B 1/12* (2024.01)
*B08B 1/30* (2024.01)

(52) U.S. Cl.
CPC .......... *B66B 7/1292* (2013.01); *A46B 13/001* (2013.01); *A46B 13/008* (2013.01); *A46B 13/02* (2013.01); *B08B 1/12* (2024.01); *B08B 1/30* (2024.01); *A46B 2200/3073* (2013.01)

(58) Field of Classification Search
CPC ....... B66B 7/1292; B66B 7/12; B66B 7/1276; A46B 13/001; A46B 13/02; A46B 13/008; A46B 2200/3073; A46B 13/00; B08B 1/12; B08B 1/30; E01B 27/026; E01H 8/10; E01H 8/12
USPC .................................. 104/279; 15/28, 54–55
See application file for complete search history.

(56) References Cited

U.S. PATENT DOCUMENTS 5,360,084 A 11/1994 Graf
8,316,496 B2 * 11/2012 Al-Qaffas .............. A46B 9/045 15/23
8,955,649 B2 2/2015 Yokobayashi
9,890,018 B2 2/2018 Lehikoinen et al.
10,052,656 B2 8/2018 Maslennikov
2019/0002243 A1 1/2019 Beauchaud et al.
2022/0346542 A1 * 11/2022 Bowman, III ....... A46B 13/008

FOREIGN PATENT DOCUMENTS

CN 1272229 C 8/2006
CN 201530652 U 7/2010
CN 206437742 U 8/2017
CN 107214585 A * 9/2017 ............. B24B 47/12
CN 107352352 A 11/2017
(Continued)

OTHER PUBLICATIONS

Extended European Search Report issued in European Application No. 24160010.5 dated Aug. 21, 2024; 6 pages.

*Primary Examiner* — Laura C Guidotti
(74) *Attorney, Agent, or Firm* — CANTOR COLBURN LLP

(57) ABSTRACT

A rail cleaning device, having: a gearbox having a first face and a second face; an input shaft extending into the gearbox via the first face of the gearbox and is configured to be coupled to a drill; output shafts extending from the gearbox via the second face and are operationally coupled to the input shaft via the gearbox; drill brushes connected to ones of the output shafts, including first and second flange brushes and a web brush between the flange brushes.

19 Claims, 4 Drawing Sheets

(56) References Cited

FOREIGN PATENT DOCUMENTS

| | | | | | |
|---|---|---|---|---|---|
| CN | 207072731 | U | | 3/2018 | |
| CN | 108328457 | A | | 7/2018 | |
| CN | 208265565 | U | | 12/2018 | |
| CN | 209193309 | U | | 8/2019 | |
| CN | 110393366 | A | * | 11/2019 | ........... A46B 13/023 |
| CN | 209567690 | U | * | 11/2019 | ............... B66B 7/12 |
| CN | 210313029 | U | | 4/2020 | |
| CN | 210505154 | U | | 5/2020 | |
| CN | 210594808 | U | | 5/2020 | |
| CN | 210682898 | U | | 6/2020 | |
| CN | 210763797 | U | | 6/2020 | |
| CN | 211004061 | U | | 7/2020 | |
| CN | 11960221 | A | * | 11/2020 | ........... B66B 7/1292 |
| CN | 111960221 | A | | 11/2020 | |
| CN | 211846773 | U | | 11/2020 | |
| CN | 212174177 | U | | 12/2020 | |
| CN | 112374325 | B | | 2/2021 | |
| CN | 212558997 | U | | 2/2021 | |
| CN | 213171018 | U | | 5/2021 | |
| CN | 214359636 | U | | 10/2021 | |
| CN | 214692778 | U | | 11/2021 | |
| CN | 214780106 | U | | 11/2021 | |
| CN | 215047823 | U | | 12/2021 | |
| CN | 114408702 | A | | 4/2022 | |
| CN | 114632744 | A | | 6/2022 | |
| CN | 216737070 | U | | 6/2022 | |
| CN | 216807707 | U | | 6/2022 | |
| CN | 216997182 | U | | 7/2022 | |
| CN | 217051183 | U | | 7/2022 | |
| CN | 217808153 | U | | 11/2022 | |
| CN | 218088465 | U | | 12/2022 | |
| CN | 218145229 | U | | 12/2022 | |
| EP | 3028978 | A1 | | 6/2016 | |
| GB | 1480525 | A | * | 7/1977 | ........... B66B 7/1292 |
| JP | H0664866 | A | | 3/1994 | |
| JP | H11139721 | A | | 5/1999 | |
| JP | 2001122558 | A | * | 5/2001 | ............... B66B 7/12 |

* cited by examiner

ELEVATOR RAIL CLEANING DEVICE

BACKGROUND

The embodiments relate to an elevator cleaning system and more specifically to an elevator rail cleaning device.

Installation of an elevator system requires installing elongated T-rails in an elevator shaft that function as a track for the elevator car. Manufacturing of T-rails may include coating the rails with rust inhibiting chemicals. Prior to installation, the chemicals are cleaned from the T-rails. The cleaning process typically requires hand scrubbing with a cloth, which can be time consuming.

BRIEF SUMMARY

Disclosed is a rail cleaning device, including: a gearbox having a first face and a second face; an input shaft extending into the gearbox via the first face of the gearbox and is configured to be coupled to a drill; output shafts extending from the gearbox via the second face and are operationally coupled to the input shaft via the gearbox; drill brushes connected to ones of the output shafts, including first and second flange brushes and a web brush between the flange brushes.

In addition to one or more aspects of the method or as an alternate, the output shafts are parallel to each other and extend longitudinally from the gearbox, and are transversely aligned, one next to another.

In addition to one or more aspects of the method or as an alternate, the first face of the gearbox is a front face and the second face of the gearbox is a back face, and the input shaft is parallel to the output shafts and extends longitudinally from the gearbox.

In addition to one or more aspects of the method or as an alternate, the gearbox is configured so that an output speed of the output shafts matches an input speed of the input shaft.

In addition to one or more aspects of the method or as an alternate, the flange brushes are round-tip cylinder brushes and the web brush is a flat-tip cup brush.

In addition to one or more aspects of the method or as an alternate, the flange brushes extend longitudinally from the gearbox further than the web brush.

In addition to one or more aspects of the method or as an alternate, shaft couplers connect the output shafts with the drill brushes, and the shaft couplers are configured for being loosened to remove the drill brushes.

In addition to one or more aspects of the method or as an alternate, the drill brushes have nylon bristles.

In addition to one or more aspects of the method or as an alternate, the device includes a handle extending transversely outward from the gearbox.

In addition to one or more aspects of the method or as an alternate, the device includes an enclosure connected to the gearbox and extending longitudinally from the gearbox to an outer edge so that the enclosure longitudinally surrounds the drill brushes such that round-tips of the flange brushes are longitudinally exposed.

In addition to one or more aspects of the method or as an alternate, the enclosure has first and second wall portions that are transversely opposite each other, that respectively define first and second slots that extend longitudinally from the outer edge of the enclosure toward the gearbox and are transversely aligned with each other and with the web brush.

In addition to one or more aspects of the method or as an alternate, the slots each extend to a slot inner end that is longitudinally aligned with a flat-tip of the web brush.

In addition to one or more aspects of the method or as an alternate, the enclosure defines a fixed wall section and removable wall section that is configured to be removed for access to the drill brushes.

In addition to one or more aspects of the method or as an alternate, the removable wall section extends longitudinally from a front end to a back end and transversely between opposite sides, wherein the back end is fastened to the gearbox, and the front end is fastened to the fixed wall section via brackets.

In addition to one or more aspects of the method or as an alternate, the removable wall section defines the first slot and the fixed wall section defines the second slot.

In addition to one or more aspects of the method or as an alternate, the gearbox and the enclosure each define a rectangular profile, the fixed wall section of the enclosure defines a U-shaped profile and the removable wall section is planar.

Disclosed is a method of cleaning a rail with a device having one or more of the above disclosed aspects, including: sliding the device against the rail so that the web is within the slots and the web brush is against an outer edge of the web, the flange brushes are against first and second web faces of the web and against first and second flange faces of a flange of the rail that are adjacent to the first and second web faces of the web;

rotating the input shaft; and guiding the device along the web of the rail while rotating the input shaft.

In addition to one or more aspects of the method or as an alternate, rotating the input shaft includes connecting the input shaft to a drill and powering the drill.

In addition to one or more aspects of the method or as an alternate, guiding the device along the web of the rail includes holding the device via the handle and moving the device along the web of the rail via the handle.

In addition to one or more aspects of the method or as an alternate, the method includes removing the removable wall section from the device to clean the drill brushes after cleaning the rail.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
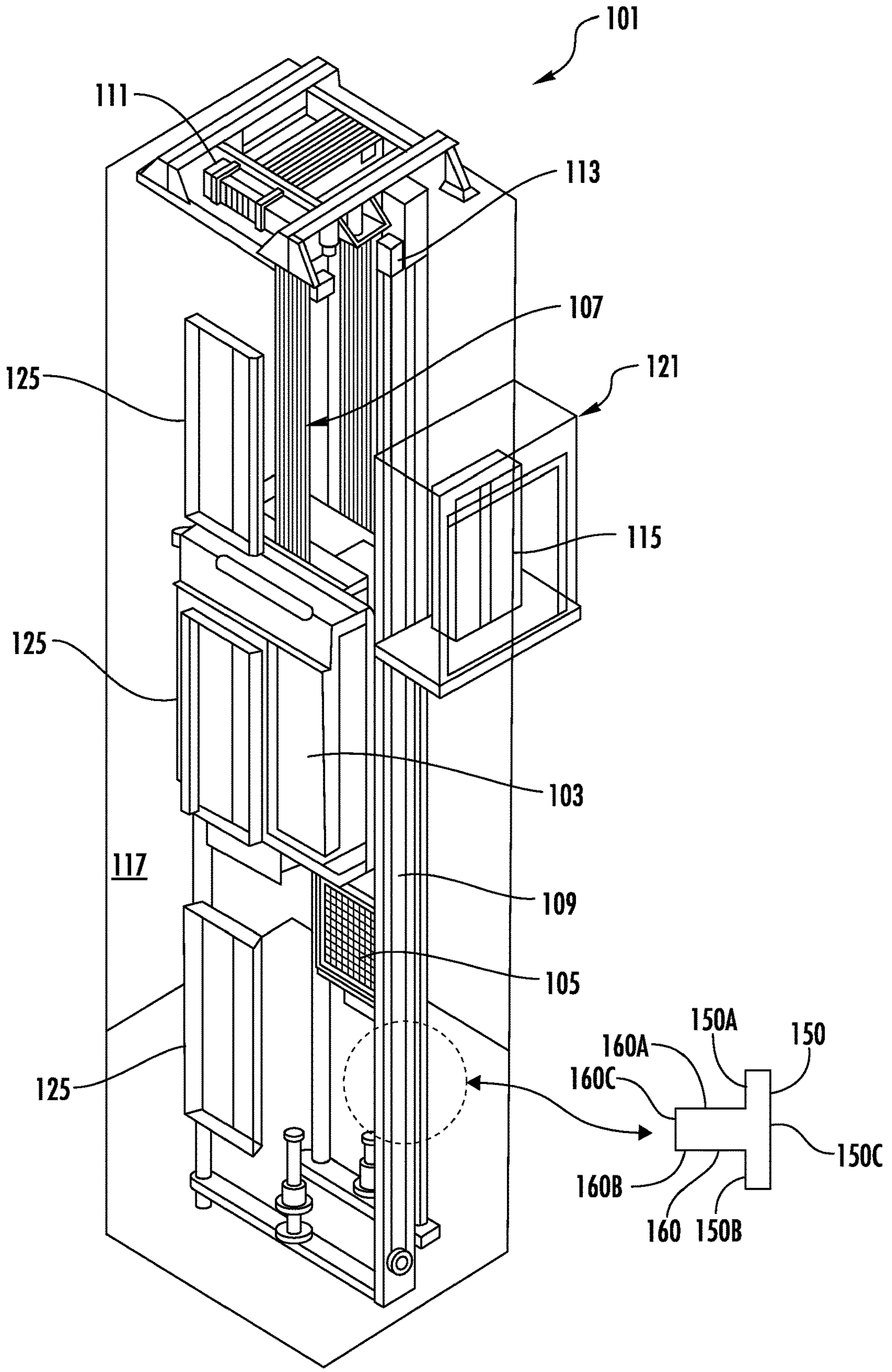
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Guide rail 109 may be a T-rail (or rail 109) having a flange 150 and a web 160. The web 160 may have opposite sides or web faces 160A, 160B and an outer tip 160C. The flange 150 may have a first surface 150A that is adjacent the first web face 160A of the web 160, a second surface 150B that is adjacent the second web face 160B of the web 160, and a back surface 150C that faces an opposite direction than the first and second surfaces 150A, 150B.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

Figure 2:
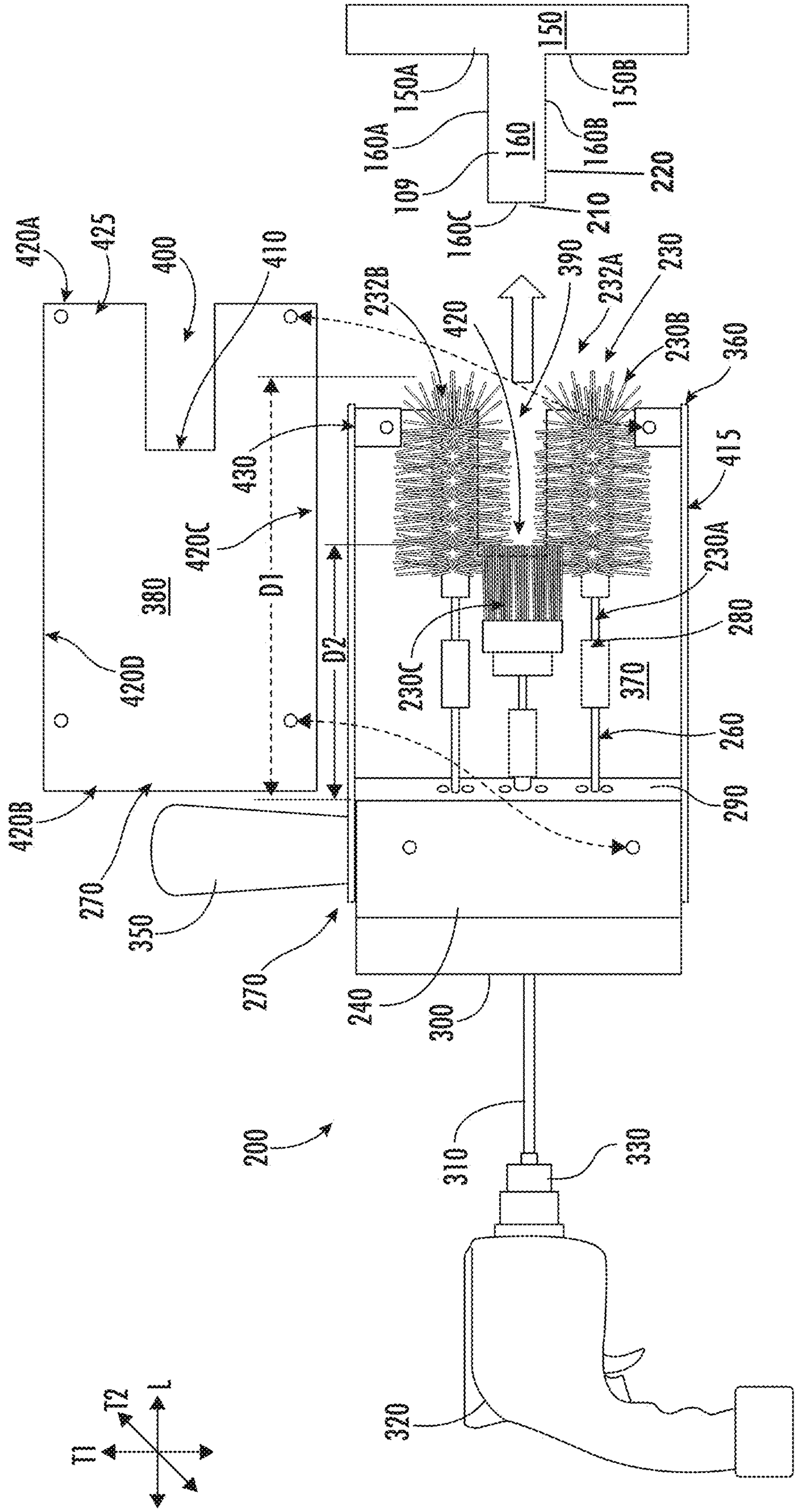
FIG. 2 shows a T-rail cleaning device according to an embodiment.

Turning to FIG. 2, a rail cleaning device 200 is shown, which is intended for use prior to installation of a rail 109, to clean the corrosion inhibiting coating 210 from the outer surface 220 of the rail 109. More specifically, this device utilizes drill brushes 230 to remove the corrosion inhibiting coating 210. The device 200 addresses rail cleaning issues that are encountered in most field sites around the world, which provides field efficiency improvements.

Generally, the device 200 includes a gear housing or gearbox 240 having therein plural gears 250, such as three gears, that simultaneously spin three output shafts 260 that respectively spin a plurality of drill brushes 230 connected to them to clean all sides of the rail 109 in one motion. The device 200 has an enclosure 270, that is a polypropylene shield, around the drill brushes 230 to protect an operator from debris by the drill brushes 230 while operating. The device 200 can be maintained by replacing the drill brushes 230 once they wear out upon loosening brush couplers 280.

More specifically, the device 200 is a rail cleaning device that includes a gearbox 240 having a first face 290 and a second face 300. An input shaft 310 extends into the gearbox 240 via the first face 290 of the gearbox 240 and is configured to be coupled to a drill 320 and more specifically a drill chuck 330. Output shafts 260 extend from the gearbox 240 via the second face 300 and are operationally coupled to the input shaft 310 via the gearbox 240. The gearbox 240 is configured so that an output speed of the output shafts 260 matches an input speed of the input shaft 310. However, a speed modification gearbox may also be utilized. The first face 290 of the gearbox 240 is a front face. The second face 300 of the gearbox 240 is a back face. The input shaft 310 is parallel to the output shafts 260 and extends longitudinally, along a longitudinal axis L, from the gearbox 240. The output shafts 260 are parallel to each other, extend longitudinally from the gearbox 240, and are transversely aligned, along a first transvers axis T1, one next to another.

Drill brushes 230 are connected to respective ones of the output shafts 260. The drill brushes 230 each have a shaft end 230A and a bristle end 230B. The drill brushes 230 have nylon bristles. The drill brushes 230 include first and second flange brushes 232A, 232B and a web brush 232C between the flange brushes 232A, 232B. The flange brushes 232A, 232B are round-tip cylinder brushes, and the web brush 232C is a flat-tip cup brush. The flange brushes 232A, 232B extend longitudinally from the gearbox 240 by a first distance D1 and the web brush 232C extends longitudinally from the gearbox 240 by a second distance D2 that is less than the first distance D1.

The differences between the first and second distances is provided for effective cleaning of the rail 109. In operation, web brush 232C is against an outer edge of the web 160, and the flange brushes 232A, 232B are against first and second web faces 160A, 160B of the web 160 and against first and second flange faces 150A, 150B of the flange 150 of that are adjacent to the first and second web faces 160A, 160B of the web 160.

Shaft couplers 280 connect the output shafts 260 with the drill brushes 230. The shaft couplers 280 are configured for being loosened to remove the drill brushes 230. A handle 350, which may be shaped as a cylinder that may be frustoconical for proper ergonomics, extends transversely outward from the gearbox 240 along the first transverse axis T1. In operation, the handle 350 is gripped by the operator while the drill 320 drives the input shaft 310. The handle 350 it utilized to move the device 200 along the web 160 of the rail 109 for cleaning purposes.

An enclosure 270 is connected to the gearbox 240 and extends longitudinally from the gearbox 240 to an outer edge 360 so that the enclosure 270 longitudinally surrounds most of the drill brushes 230 with the round-tips of the flange brushes 232A, 232B longitudinally exposed for engaging the flange 150 of the rail 109. The enclosure 270 has first and second wall portions 370, 380 that are transversely opposite each other along a second transverse axis T2 that is perpendicular to the first transverse axis T1, where each transverse axis is perpendicular to the longitudinal axis L. The wall portions 370, 380 respectively define first and second slots 390, 400 that extend longitudinally from the outer edge 360 of the enclosure 270 toward the gearbox 240 and are transversely aligned with each other and with the web brush 232C. The slots 390, 400 each extend to a slot inner end 410 that is longitudinally aligned with the flat-tip 420 of the web brush 232C.

The gearbox 240 and enclosure 270 each define a rectangular profile. The enclosure 270 defines a fixed wall section 415 and removable wall section 425 that is configured to be removed for access to the drill brushes 230. The fixed wall section 415 of the enclosure 270 defines a U-shaped profile and the removable wall section 425 is planar. The removable wall section 425 extends longitudinally from a front end 420A to a back end 420B and transversely between opposite sides 420C, 420D. The back end 420B is fastened to the gearbox 240. The front end 420A is fastened to the fixed wall section 415 via brackets 430. The removable wall section 425 defines the first slot 390 and the fixed wall section defines the second slot 400.

Figure 3:
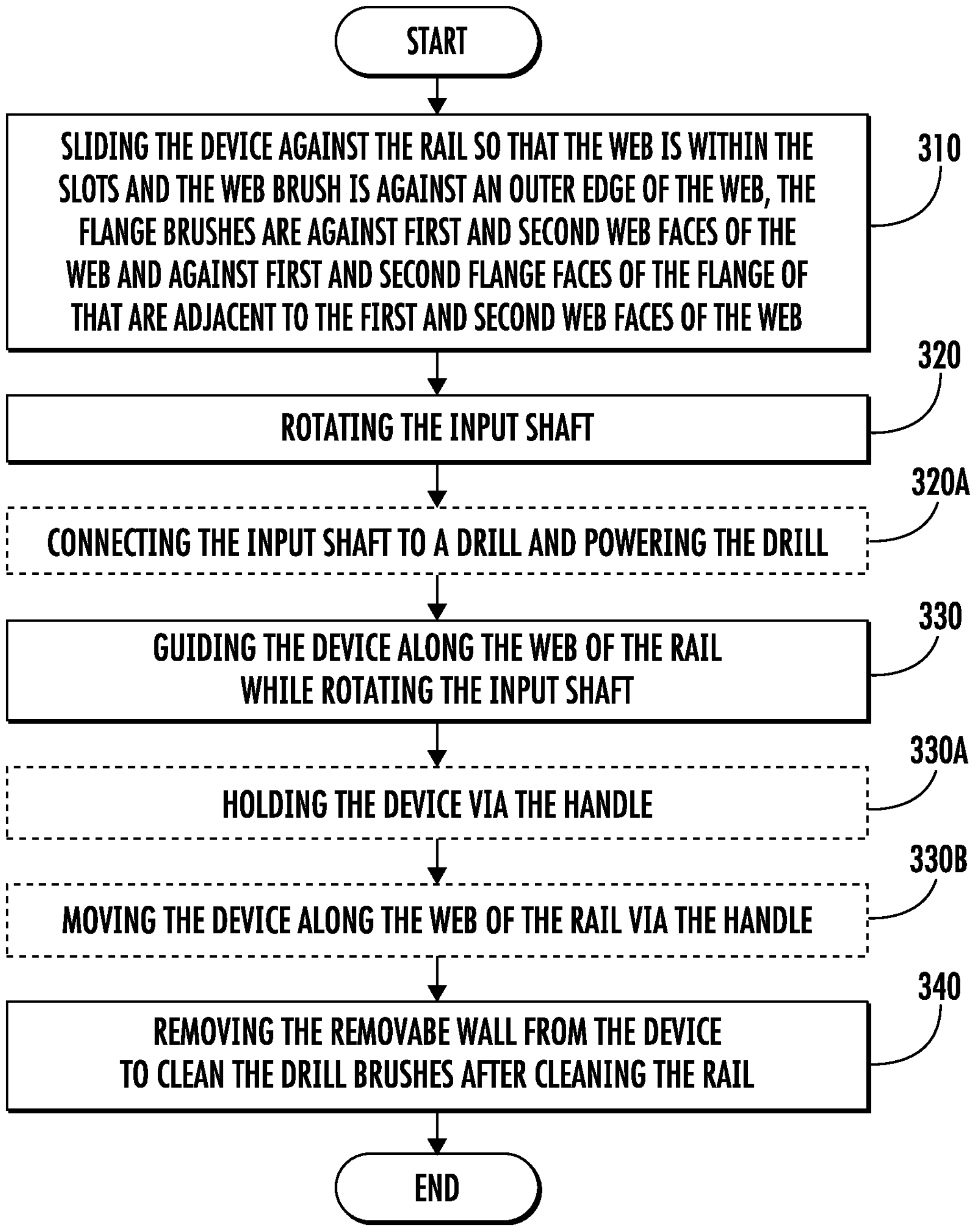
FIG. 3 is a flowchart showing a method of cleaning a rail with the device.

Turning to FIG. 3, a flowchart shows a method of cleaning a rail 109 with the device 200. As shown in block 310 the method includes sliding the device 200 against the rail 109 so that the web is within the slots 390, 400 and web brush 232C is against an outer edge 160C of the web 160, the flange brushes 232A, 232B are against first and second web faces 160A, 160B of the web 160 and against first and second flange faces 150A, 150B of the flange 150 of that are adjacent to the first and second web faces 160A, 160B of the web 160. As shown in block 320 the method includes rotating the input shaft 310. As shown in block 320A, rotating the input shaft (block 320) may include connecting the input shaft 310 to a drill chuck 330 of a drill 320 and powering the drill 320. As shown in block 330, the method includes guiding the device 200 along the web 160 of the rail 109 while rotating the input shaft 310. As shown in block 330A, guiding the device 200 (block 330) may include holding the device 200 via the handle 350. As shown in block 330B, guiding the device (block 330) may also include moving the device along the web 160 of the rail 109 via the handle 350. As shown in block 340, the method includes including removing the removable wall section 425 from the device 200 to clean the drill brushes 230 after cleaning the rail 109.

Figure 4:
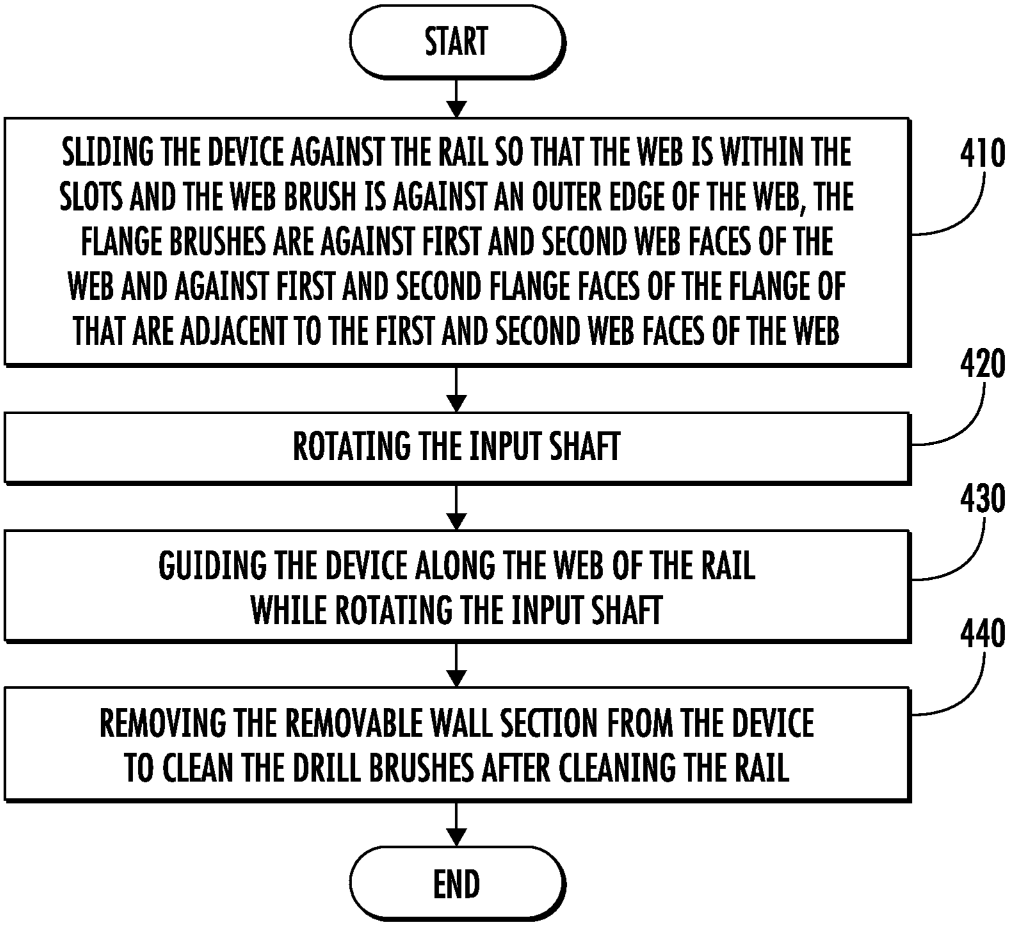
FIG. 4 is another flowchart showing more generally a method of cleaning a rail with the device.

Turning to FIG. 4, another flowchart shows a more generally the method of cleaning a rail 109 with the device 200. As shown in block 410 the method includes sliding the device 200 against the rail 109 so that web is within the slots 390, 400 of the web brush 232C is against an outer edge of the web 160, the flange brushes 232A, 232B are against first and second web faces 160A, 160B of the web 160 and against first and second flange faces 150A, 150B of the flange 150 of that are adjacent to the first and second web faces 160A, 160B of the web 160. As shown in block 420 the method includes rotating the input shaft 310. As shown in block 430, the method includes guiding the device 200 along the web 160 of the rail 109 while rotating the input shaft 310.

Benefits of the device 200 include reduced manpower in cleaning the rails prior to installation, which could provide a significant increase in efficiency in the field for cleaning rails prior to installation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rail cleaning device, comprising:

a gearbox having a first face and a second face;

an input shaft extending into the gearbox via the first face of the gearbox and is configured to be coupled to a drill;

output shafts extending from the gearbox via the second face and are operationally coupled to the input shaft via the gearbox;

drill brushes connected to ones of the output shafts, including first and second flange brushes and a web brush between the flange brushes, wherein the flange brushes are cylinder brushes and the web brush is a cup brush.

2. The device of claim 1, wherein the output shafts are parallel to each other and extend longitudinally from the gearbox, and are transversely aligned, one next to another.

3. The device of claim 2, wherein the first face of the gearbox is a front face and the second face of the gearbox is a back face, and the input shaft is parallel to the output shafts and extends longitudinally from the gearbox.

4. The device of claim 3, wherein the gearbox is configured so that an output speed of the output shafts matches an input speed of the input shaft.

5. The device of claim 4, wherein the flange brushes extend longitudinally from the gearbox further than the web brush.

6. The device of claim 5, wherein shaft couplers connect the output shafts with the drill brushes, and the shaft couplers are configured for being loosened to remove the drill brushes.

7. The device of claim 6, wherein the drill brushes have nylon bristles.

8. The device of claim 7, including
a handle extending transversely outward from the gearbox.

9. The device of claim 8, including
an enclosure connected to the gearbox and extending longitudinally from the gearbox to an outer edge so that the enclosure longitudinally surrounds the drill brushes such that round-tips of the flange brushes are longitudinally exposed.

10. The device of claim 9, wherein
the enclosure has first and second wall portions that are transversely opposite each other, that respectively define first and second slots that extend longitudinally from the outer edge of the enclosure toward the gearbox and are transversely aligned with each other and with the web brush.

11. The device of claim 10, wherein
the slots each extend to a slot inner end that is longitudinally aligned with a flat-tip of the web brush.

12. The device of claim 11, wherein
the enclosure defines a fixed wall section and removable wall section that is configured to be removed for access to the drill brushes.

13. The device of claim 12, wherein
the removable wall section extends longitudinally from a front end to a back end and transversely between opposite sides, wherein the back end is fastened to the gearbox, and the front end is fastened to the fixed wall section via brackets.

14. The device of claim 13, wherein
the removable wall section defines the first slot and the fixed wall section defines the second slot.

15. The device of claim 13, wherein
the gearbox and the enclosure each define a rectangular profile, the fixed wall section of the enclosure defines a U-shaped profile and the removable wall section is planar.

16. A method of cleaning a rail with the device of claim 1, comprising:
sliding the device against the rail so that a web of the railing is within slots defined in an enclosure of the device, and the web brush is against an outer edge of the web, the flange brushes of the device are against first and second web faces of the web and against first and second flange faces of a flange of the rail that are adjacent to the first and second web faces of the web;
rotating the input shaft; and
guiding the device along the web of the rail while rotating the input shaft.

17. The method of claim 16, wherein
rotating the input shaft includes connecting the input shaft to a drill and powering the drill.

18. The method of claim 17, wherein guiding the device along the web of the rail includes holding the device via a handle of the device and moving the device along the web of the rail via the handle.

19. The method of claim 18, including removing a removable wall section from an enclosure of the device to clean the drill brushes after cleaning the rail.

* * * * *